United States Patent [19]

Greenfield et al.

[11] Patent Number: 4,608,120
[45] Date of Patent: Aug. 26, 1986

[54] APPARATUS FOR REMOVING LIGHT OIL FROM SOLIDS

[75] Inventors: Charles Greenfield, Murray Hill; Robert E. Casparian, Boonton; Anthony J. Bonanno, Parsippany, all of N.J.

[73] Assignee: Hanover Research Corporation, East Hanover, N.J.

[21] Appl. No.: 587,133

[22] Filed: Mar. 7, 1984

Related U.S. Application Data

[62] Division of Ser. No. 419,574, Sep. 17, 1982.

[51] Int. Cl.[4] .......................... B01D 1/14; B01D 1/26
[52] U.S. Cl. ................................. 159/17.1; 159/4.02; 159/16.1; 159/47.3; 202/174; 202/185 R
[58] Field of Search .................... 203/47, 21, 49; 159/16.1, 4.02, 47.1, 47.3, DIG. 3, 16.2, DIG. 40, 16.3, 17 R, DIG. 10; 202/174, 185.1; 34/57 R; 165/104.11

[56] References Cited

U.S. PATENT DOCUMENTS

| | | | |
|---|---|---|---|
| 1,558,022 | 10/1925 | Lissauer | 159/16.2 |
| 3,322,181 | 5/1967 | Williams | 159/16.2 |
| 3,323,575 | 6/1967 | Greenfield | 159/17 R |
| 3,855,079 | 12/1974 | Greenfield et al. | 159/17 R |
| 3,876,490 | 4/1975 | Tsuruta | 159/16.2 |
| 3,890,207 | 6/1975 | Chapman et al. | 159/46 |
| 3,950,230 | 4/1976 | Greenfield et al. | 159/17 R |
| 4,239,617 | 12/1980 | Karnofsky | 159/17 R |
| 4,270,974 | 6/1981 | Greenfield et al. | 159/17 R |
| 4,276,115 | 6/1981 | Greenfield et al. | 159/17 R |
| 4,289,578 | 9/1981 | Greenfield et al. | 159/17 R |

*Primary Examiner*—S. Leon Bashore
*Assistant Examiner*—V. Manoharan
*Attorney, Agent, or Firm*—Richard L. Cannaday; Edwin T. Yates; John F. Smith

[57] ABSTRACT

An apparatus for removing light oil from solids. The invention is particularly applicable to the removal of residual light oil from solids obtained in an apparatus where aqueous solids are mixed with a light fluidizing oil and subjected to dehydration by heat evaporation. Aqueous solids are mixed with a low viscosity, relatively volatile, water-immiscible light fluidizing oil in a fluidizing tank to obtain a mixture which will remain fluid and pumpable after removal of essentially its entire water content. The mixture of solids, water and fluidizing oil is subjected to a dehydration step by heat evaporation whereby substantially all of the water and at least part of the light oil are evaporated and subsequently recovered. The light fluidizing oil is then largely separated from the solids in a liquid-solid separating means. The solids carrying residual light fluidizing oil are then brought into direct contact in a deoiler apparatus with a hot, inert gas, referred to herein as "blowing gas." The hot, inert blowing gas effects the removal of the residual light oil from the solids. Light oil vapor removed from these solids is separated from effluent blowing gas by condensation and recovered. Effluent blowing gas, free of light oil vapor, may be recycled. The inert blowing gas may be gaseous products of combustion obtained from, for example, a boiler-furnace. Alternatively, the blowing gas may be an inert gas, other than gaseous combustion products, that is heated in the heating region of a boiler-furnace. In either case, the boiler-furnace may or may not be otherwise associated with the apparatus for the dehydration of aqueous solids mixed with light fluidizing oil.

8 Claims, 4 Drawing Figures

APPARATUS FOR REMOVING LIGHT OIL FROM SOLIDS

This is a division of application Ser. No. 419,574, filed Sept. 17, 1982, now U.S. Pat. No. 4,518,458, issued May 21, 1985.

This invention is broadly concerned with the removal of light oil from solids. More particularly, it is concerned with the removal of residual light oil from solids obtained in a process where aqueous solids are mixed with a light fluidizing oil and subjected to dehydration by heat evaporation.

BACKGROUND OF THE INVENTION

The economic disposal of waste solids and recovery of clean water from aqueous solutions and dispersions thereof is a recognized problem. Also, the need to recover clean water and valuable solid materials from aqueous solutions and dispersions thereof is a common occurrence. Ideally, apparatuses and processes for the recovery of water from aqueous solids should provide ease of disposition of all constitutents, avoidance of pollution, economic operation and hygienic handling, and should, in addition, yeild clean water. Furthermore, in the course of recovering clean water it is desirable to obtain by-products, both solid and liquid, which are either valuable in themselves or can be utilized to further the economics of the process. For purposes of this invention it is to be understood that the term "aqueous solids" is employed generically to include suspensions, dispersions, solutions, mixtures and other forms of fluid association of solids in water.

In our U.S. Pat. No. 3,855,079 titled "Process and Apparatus for Recovering Residual Oil from Solids Dehydrated in an Oil Medium and Grossly Deoiled" are described process and apparatus whereby aqueous solids are admixed with a relatively non-volatile fluidizing oil to form a mixture which is dehydrated by heat evaporation. The substantially anhydrous solids in fluidizing oil slurry thus formed is thereafter separated into the oil phase and the solids phase. However, the solids have sorbed thereon appreciable amounts of fluidizing oil which contaminates the solids and which will be lost to the process and contribute to unfavorable economics if not recovered. Accordingly, the fluidizing oil-laden solids are subjected to a subsequent extraction step using a relatively volatile, water-immiscible light oil. The light oil-laden solids are then brought into direct contact with blowing steam to effect removal of the residual water-immisible light oil from the solids.

In our U.S. Pat. No. 4,270,974 titled "Process and Apparatus for Recovering Clean Water and Solids from Aqueous Solids" are described process and apparatus in which aqueous solids are mixed with a low viscosity, relatively volatile, water-immiscible light fluidizing oil to form a mixture which is subjected to dehydration by heat evaporation whereby substantially all of the water and at least part of the light oil are evaporated and subsequently recovered. The light fluidizing oil is then largely separated from the solids. The solids, carrying residual light fluidizing oil, are brought into direct contact with blowing steam to cause removal of the residual light fluidizing oil therefrom.

SUMMARY OF THE INVENTION

Braodly, the process and apparatus of this invention comprise a series of steps and a systematic arrangement of equipment for separating light oil from solids associated therewith. More particularly, the invention is concerned with the removal of residual light oil from solids obtained from the dehydration of a mixture of aqueous solids and fluidizing oil. In one embodiment, aqueous solids are slurried with a relatively non-volatile fluidizing oil to form a mixture which is dehydrated by heat evaporation. The substantially anhydrous slurry of solids in fluidizing oil is then separated into the oil phase and the solids phase. Since the solids have sorbed thereon appreciable amounts of relatively non-volatile fluidizing oil, they are subjected to an extraction step using a relatively volatile light oil. In another embodiment of this invention, aqueous solids are mixed with a low viscosity, relatively volatile, water-immiscible light fluidizing oil and the resultant mixture subjected to dehydration by heat evaporation whereby substantially all of the water and at least part of the light fluidizing oil are evaporated and subsequently recovered. The light fluidizing oil is then largely separated from the solids. In the case of either of the foregoing embodiments, the process and apparatus of the instant invention provide for the economical removal of the residual light oil from the separated dry solids.

It is therefore an object of this invention to provide process and apparatus for the separation of light oil from solids associated therewith.

It is another object of this invention to provide process and apparatus for the removal of residual light oil from solids obtained by the dehydration of a mixture of aqueous solids in a relatively volatile, water-immiscible light fluidizing oil.

It is yet another object of this invention to provide process and apparatus for the removal of residual light oil from solids obtained by the dehydration of a mixture of aqueous solids in a relatively non-volatile fluidizing oil wherein said anhydrous solids are separated from the non-volatile fluidizing oil and residual fluidizing oil is extracted therefrom by a relatively volatile light oil.

It is still another object of this invention to provide process and apparatus for recovering substantially dry, fluidizing oil-free solids from aqueous solids dehydrated in a fluidizing oil medium.

Yet another object of this invention is to provide process and apparatus for the recovery of clean water from aqueous solids.

The foregoing and other objects are accomplished by the practice of this invention. Broadly, viewed in one of its principal aspects, this invention consists of a process for the separation of light oil from solids associated therewith comprising the steps:

1. Bringing the light oil-laden solids into direct contact with a hot, inert blowing gas to thereby remove said light oil from said solids by heat evaporation, and 2. Conducting effluent inert blowing gas containing light oil vapor away from said solids.

The foregoing process is carried out in an apparatus for separating light oil from solids associated therewith, said apparatus comprising a systematic arrangement of items of equipment as follows:

1. A deoiler means adapted to receive light oil-laden solids;

2. Means for generating hot, inert blowing gas;

3. A conduit extending from said means for generating hot, inert blowing gas to said deoiler means wherethrough may flow hot, inert blowing gas to come into direct contact with said light oil-laden solids within said deoiler means, and 4. A venting means extending from said deoiler means wherethrough may flow effluent inert blowing gas containing light oil vapor.

The instant invention thus provides process and apparatus for separating light oil from solids associated therewith. More particularly, this invention provides process and apparatus for the removal of residual light oil from solids obtained from the dehydration of a mixture of aqueous solids and a fluidizing oil. In its most preferred embodiment, the fluidizing oil is a relatively volatile, water-immiscible light oil. The invention is characterized by the recovery not only of clean water from aqueous solids which are dehydrated in a light oil medium but also of residual light oil from said solids. Aqueous solids are mixed with a low viscosity, relatively volatile, water-immiscible light fluidizing oil and the mixture subjected to a dehydration step by heat evaporation to remove substantially all of the water and part of the light oil. The remainder of the light fluidizing oil is then largely separated from the solids. The light fluidizing oil-laden solids are thereafter brought into direct contact with a hot, inert gas, referred to herein as "blowing gas," in a deoiling step. Direct contact of the light oil with the hot, inert blowing gas causes its evaporation and separation from the solids. In contrast to the process disclosed in U.S. Pat. No. 3,855,079 and U.S. Pat. No. 4,270,974 where deoiling is accomplished by contacting light fluidizing oil-laden solids with blowing steam, the instant invention does not require a major oil-water separation as is required after condensation of effluent blowing steam and light oil vapor.

The nature and substance of the present invention as well as its objects and advantages will be more clearly perceived and fully understood by referring to the following description and claims taken in connection with the accompanying drawings which are described briefly below.

DESCRIPTION OF THE PREFERRED EMBODIMENTS

Figure 1:
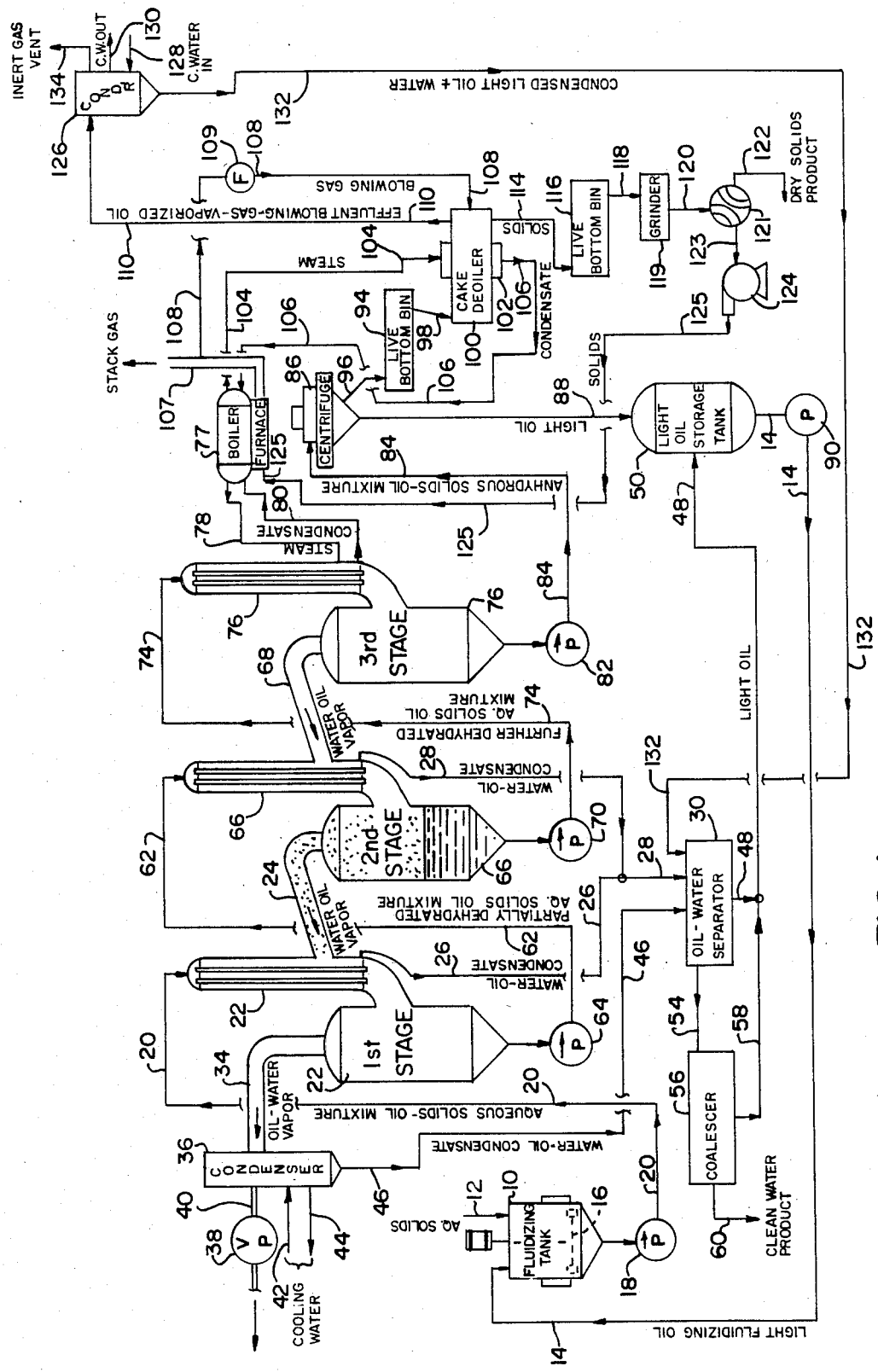
FIG. 1 illustrates the apparatus of the embodiment of the invention wherein a mixture of aqueous solids in a relatively volatile, water-immiscible light fluidizing oil is subjected to dehydration by heat evaporation followed by separation of most of the light fluidizing oil from the essentially anhydrous solids. The essentially anhydrous solids, containing residual light oil, are brought into direct contact in a deoiler apparatus with gaseous products of combustion from a furnace. The gaseous products of combustion act as hot, inert blowing gas to facilitate the separation of residual light oil from said solids.

The process of this invention is thus characterized by the separation of light oil from solids associated therewith. More particularly, the invention is concerned with the removal of residual light oil from solids previously substantially dehydrated in a fluidizing oil medium. In one embodiment, the process comprises mixing aqueous solids with a low viscosity, relatively volatile, water-immiscible light fluidizing oil to obtain a mixture which will remain fluid and pumpable after removal of essentially its entire water content, and thereafter subjecting the resultant mixture of solids, water and oil to a dehydration step by heat evaporation whereby substantially all of the water and at least part of the light fluidizing oil are evaporated and subsequently recovered. Extremely dilute aqueous solids may be concentrated by evaporation prior to mixing with the light oil. The vapors from the subsequent oil dehydration step can be used to supply the energy to this fluidizing oil-free concentration stage of the evaporator system. Following dehydration, the light oil is largely separated from the solids. Those solids carrying residual light fluidizing oil are brought into direct contact with a hot, inert blowing gas whereby the residual light oil is removed by heat evaporation.

In another embodiment of the invention, the process comprises the steps of mixing aqueous solids with a relatively non-volatile oil to obtain a mixture which will remain fluid and pumpable after removal of essentially its entire water content and thereafter subjecting the resultant mixture of solids, water and oil to a dehydration step by heat evaporation with subsequent recovery of the evaporated water and a substantially anhydrous slurry of solids in oil. Extremely dilute aqueous solids may be concentrated by evaporation prior to mixing with the oil. The slurry of solids in oil is separated to yield the relatively non-volatile oil and solids laden with residual non-volatile oil. The residual non-volatile oil is substantially removed from the solids by extraction with a relatively low viscosity light oil. The light oil-laden solids are then brought into direct contact with a hot, inert blowing gas whereby the relatively volatile light oil is removed by heat evaporation.

A critical step in the practice of the instant invention is the direct contacting of the light oil-laden solids with hot, inert blowing gas to thereby effect evaporation of said light oil. If the hot, inert blowing gas be at a sufficiently high temperature it will supply the latent heat for the evaporation of the light oil. On the other hand, the light oil-laden solids may be directly contacted with inert blowing gas at a lower temperature provided sufficient heat for vaporization of the light oil be supplied by an external source such as via a heat jacketed device.

By light oil is meant an organic liquid that is relatively fluid as well as relatively volatile. In the case where the light oil is a fluidizing oil used in the dehydration of aqueous solids, it should also be water-immiscible. If the light oil is used only to extract a relatively non-volatile oil from solids associated therewith, the light oil need not be water-immiscible but it should be miscible with the relatively non-volatile oil. By the practice of this invention, the direct contacting of light oil-laden solids with a hot, inert blowing gas facilitates the ready and economical separation of light oil from the solids.

In the practice of this invention, an essentially anhydrous slurry of solids in fluidizing oil is separated to recover the oil and the solids in a largely dry condition but containing sorbed fluidizing oil. This may be accomplished by gravity or by mechanical pressure of either a static or a dynamic variety, or both, on the anhydrous slurry whereby the greater part of the oil is separated from the solids. In some cases, as in the processing of food products, sewage sludge, rendering raw materials, or slaughter house wastes, the material itself contains an appreciable amount of oil independently of the fluidizing oil which may be added to it prior to the dehydration step. If that oil be a light oil, it will be either evaporated during dehydration and subsequenly recovered or carried through the dehdration step along with the solids and the major part of the added fluidizing oil and be subjected to being separated from the dehydrated slurry along with the added oil. If the essentially water-free slurry be subjected to a sufficiently efficient separation, it may thus be made to yield oil in a quantity or at a rate equal to or in excess of that in or at which oil was previously added to the aqueous solids. If the oil associated with the aqueous solids be a heavy, relatively non-volatile oil and if the fluidizing oil be a light, relatively volatile oil, it may in effect be extracted from the essentially dry solids by the light fluidizing oil during the separation step, e.g., a pressing operating, separated from the light oil, and recovered. Alternatively, if the fluidizing oil be a heavy, relatively non-volatile oil, the associated oil becomes part of the fluidizing oil. After separation of the major portion of heavy fluidizing oil, essentially dry solids containing residual heavy oil are extracted with a light oil to remove the heavy oil therefrom.

Generally it is desirable that the overall oil separation and deoiling steps yield enough oil for reuse in the dehydration step so that the process will be self-sufficient with respect to fluidizing oil requirements. Even more desirably, in some cases the combined oil separation and deoiling steps will generate somewhat more oil than is needed for the dehydration step so that the process will provide a net oil yield.

No matter how vigorous the separation, e.g., pressing, of the essentially anhydrous slurry of solids in fluidizing oil, the recovered solids will have sorbed thereon appreciable quantities of oil which, if not recovered, will be lost to the process. The liquid-solid separating means to separate the fluidizing oil from the solids may be, for example, a settling tank where separation occurs by gravity. Alternatively, separation may be by means of a mechanical press of the static variety, e.g., a reciprocating filter press, or, more advantageously, by means of a dynamic separating device such as a centrifuge. However, both static and dynamic presses may be used. Accordingly, most of the oil is pressed from the solids in, for example, a centrifuge, and the oil may be collected in a suitable reservoir where it is available for reuse in the process if so desired.

In the case where aqueous solids are dehydrated in a light, relatively volatile fluidizing oil, the aqueous solids may originally contain a light oil. In this instance, the light oil is recovered and may be reused in the dehydration step. On the other hand, if the aqueous solids originally contain a heavy oil, it may be separated from the essentially anhydrous solids due to extraction by the light fluidizing oil during the liquid-solid separating step. If the separated oil is divided into its light oil and heavy oil components and only the light oil component recycled as fluidizing oil, the net result is a reduction in the heavy oil content of the dry solids. On the other hand, if the gross separated oil comprised of light fluidizing oil and extracted heavy oil is recycled as the fluidizing oil, an equilibrium is attained wherein heavy oil is put back into the dry solids at the same rate it is removed by the recycled gross fluidizing oil. The net result is essentially dry solids having substantially the same heavy oil content on a moisture-free basis as the original feed.

Since the light fluidizing oil may have a low viscosity and a low specific gravity, e.g., light oils of petroleum origin, the dehydrated slurry from the evaporator can be transferred to a settling tank whereby a more concentrated solids in oil phase may be separated as a thickened slurry; the bulk of the oil remains at the top of the tank from which it may be recycled to the process. The foregoing gravity separation operation does not require a mechanical press of either a static or a dynamic variety.

In the case where aqueous solids are dehydrated in a heavy, relatively non-volatile fluidizing oil, the aqueous solids may originally contain a light oil. In this instance, the light oil is essentially removed with the water during the dehydration step and may be recovered therefrom. If the aqueous solids originally contain a heavy oil, this oil will be carried through the dehydration step along with the solids and the added fluidizing oil and be subjected to being pressed out of the dehydrated slurry along with the added oil.

No matter how vigorous the pressing of the anhydrous slurry of solids in non-volatile oil, the recovered solids will have sorbed thereon appreciable quantities of non-volatile oil which, if not recovered, will be lost to the process. In the practice of this invention, the non-volatile oil-laden solids are extracted with a relatively light oil to thus remove the non-volatile oil therefrom. The extraction may conveniently be carried out in the liquid-solid separating means in which the non-volatile oil is expressed from the solids. While the liquid-solid separating means may be of the static variety, e.g., a cage-type piston press, it is advantageous to employ a dynamic separating means such as a centrifuge. Accordingly, most of the non-volatile oil is pressed from the solids in, for example, a centrifuge, and the oil may be collected in a suitable reservoir where it is available for reuse in the process if so desired. The non-volatile oil-laden solids remaining in the centrifuge are then contacted therein with the relatively light oil, and the relatively light oil containing extracted non-volatile oil is thereafter pressed from the solids. The mixture of relatively light oil and extracted non-volatile oil may, if desired, be separated by distillation, e.g., returning to the evaporation system for recovery of light oil from the non-volatile oil, and the individual components reused in the process.

The concentrated light oil-solids slurry or solids having light oil sorbed thereon are then brought into direct contact with a hot, inert blowing gas. The blowing gas, if sufficiently hot, supplies latent heat for the evaporation of the light oil. Alternatively, inert blowing gas at a lower temperature may be used in conjunction with external heat as from a steam jacket to supply heat for evaporation of the light oil.

There are a number of advantages to using a hot, inert blowing gas rather than blowing steam in the deoiling step. Use of a hot, inert blowing gas rather than blowing steam places less of a load on the steam generating capacity of a system for dehydrating aqueous solids in a fluidizing oil medium. In fact, the inert blowing gas may be gaseous products of combustion from the furnace used to generate steam for the system, in effect, a byproduct. Another advantage of inert blowing gas over blowing steam is that there is less need for an oil/water separation following condensation of oil vapor removed in the deoiling step. Yet another advantage of inert blowing gas over blowing steam is the possibility of more heat per unit volume of inert blowing gas compared to steam. It is known that at standard conditions of temperature and pressure, a volume of 22.4 liters will contain one gram molecular weight of a gas. It follows that, the higher the molecular weight of a gas, the greater the weight of the gas in a specified volume at specified temperature and pressure. Thus, by choosing an inert gas having a higher molecular weight than water (steam), comparable volumes at comparable pressures and temperatures would contain more pounds of inert gas than pounds of steam. Hence, at any one pressure and temperature, more heat (e.g., BTU's) would be available for vaporizing sorbed light oil from dry solids by a unit volume of the inert gas than by an identical volume of steam where the value of molecular weight multiplied by specific heat is greater for the gas. Any heavy oil present on the dry solids, however, is essentially not evaporated. An example of an inert gas having a higher molecular weight than water (M.W.18).

The source of hot, inert blowing gas may vary widely. One source of hot, inert blowing gas is the gaseous products of combustion from a combustion apparatus such as a furnace. Alternatively, an inert gas such as nitrogen or carbon dioxide may be heated, as in a combustion apparatus, and used as blowing gas. In a system for dehydrating aqueous solids in a fluidizing oil, the combustion apparatus may conveniently be the furnace associated with the boiler used to generate steam for supplying evaporative heat to the evaporator in the system. Thus, the furnace in the system may be the source of hot, gaseous products of combustion used as the blowing gas. Those gaseous products may include at least some excess air (non-stoichiometric combustion) and still be deemed inert for purposes of the present invention. Alternatively, the furnace in the system may be the means for heating an inert gas such as nitrogen or carbon dioxide which would then be used as the hot blowing gas. It will be understood, of course, that the source of hot, inert blowing gas need not be part of the system for dehydrating aqueous solids in a fluidizing oil medium. For example, a furnace not otherwise associated with the system may be the source of gaseous combustion products used as blowing gas or the means for heating an inert blowing gas such as nitrogen or carbon dioxide.

In most cases, the choice of inert blowing gas to come into direct contact with light oil-laden solids or concentrated light oil-solids slurry is not critical. However, in certain applications such as deoiling materials like food products for human consumption and animal feeds, it is preferable to use an inert gas such as nitrogen or carbon dioxide rather than gaseous products of combustion for the blowing gas.

The removal of light oil from the solids by direct contact with hot, inert blowing gas may conveniently take place in a deoiler apparatus which may be operated at atmospheric or less than atmospheric pressure. Lower temperature blowing gas may be used at atmospheric pressure where blowing steam would require a vacuum. If desired, the deoiler apparatus may be externally heated as by means of a steam jacket. Hot, inert blowing gas is passed into the deoiler apparatus containing the concentrated light oil-solids slurry or light oil-laden solids. Effluent blowing gas and vaporized light oil are conducted from the deoiler apparatus. Any heavy oil present on the solids is essentially not evaporated.

In the case where aqueous solids in fluidizing oil are subjected to dehydration, the solids left after removal of the light oil therefrom by direct contact with a hot, inert blowing gas may often be utilized for purposes outside the process itself and thus constitute a process product. The process and apparatus of this invention may be used to recover clean water and essentially dry solids from aqueous solids derived from numerous sources whether they be waste solids or solids having intrinsic value. Thus, for example, this invention finds utility in the recovery of water and solids from a variety of materials which are found in aqueous solutions, in water dispersion or otherwise associated with water, e.g., divided coal, food products, animal feeds and wastes, cement, spent lime, inorganic salts, sewage, sewage sludge, slaughter house effluent and rendering materials, slimes, black liquours from the paper industry, certain tree barks, refuse, organic streams from garbage disposal plants, pharmaceutical products and wastes, cannery or canning factory effluent, chemicals, etc. Accordingly, depending on the source, the solids recovered from the hot blowing gas contacting operation may be used as fertilizer, as animal feed, or possibly as food for human consumption, e.g., a dehydrated, fat-free food product. Further, since they are often burnable, they may be used as fuel for the generation of steam needed to run the evaporator component of the apparatus, for generating hot, inert blowing gas for contacting the concentrated oil-solids slurry or the oil-laden solids, and also the steam needed to run auxiliary equipment such as pumps, either directly if they be steam-driven pumps or indirectly if they be motor driven pumps and the steam is used to run a turbogenerator directly. Any heavy oil remaining on the essentially dry solids also may have fuel value. The process may thus be at least partly self-sufficient in respect of the fuel requirements. The process and apparatus of this invention thus provide means for the recovery of essentially clean water and valuable solid products from aqueous solids. Furthermore, this invention is characterized by the fact that residual light oil that is sorbed on or otherwise associated with the solids is efficiently recovered for reuse.

The material to be treated by the process of this invention should contain solid particles generally smaller than about $\frac{1}{4}$ inch. However, larger particles are acceptable, as in the case of bone for gelatin manufacture, provided that the clearances between heat transfer surfaces be increased accordingly. Larger particles may be ground to size or comminuted by existing techniques. This applies particularly in the case of coal.

The oils that are utilized for admixture with the aqueous solids prior to the dehydration operation are inert and water-immiscible. Typical relatively non-volatile fluidizing oils or fats are tallow, other animal fats and vegetable oils, all of which often can be derived directly from the process operation; petroleum oils and their fractions and derivatives including fuel oils; silicone oils, glycerides, higher molecular weight fatty acids, and miscellaneous liquid wastes from industrial plants, being generally of an organic nature. It is desirable to employ an oil that imparts process credits, i.e., one that can add value to the solids product, such as waste oils normally found in sewage or industrial wastes, or fuel oils, or, as suggested above, employ oils derived in the practice of the process itself so as to minimize cost factors. The quantity of oil is such that its ratio in the system is in the range of about 2 to about 20 parts or more by weight, based on each part of non-fat or non-oil based solids. This refers to total oil, i.e., that added plus that derived from the process for reuse. This amount of oil gives a fluid, pumpable mixture even in the absence of water. The term "fluid" as used here is intended to be synonymous with "liquid", i.e., taking the shape of the container to the extent that the mixture fills the container. This will also include heavy, viscous fluids which are pumpable but still suitable for heat transfer purposes.

Light fluidizing oils should not only be inert and water-immiscible but should in addition be sufficiently volatile to be evaporated by direct contact with hot, inert blowing gas at a temperature within the range of from about 70° F. to about 400° F. Generally, light oils boiling within the range of from about 150° F. to about 550° F., and preferably from about 300° F. to about 450° F., are contemplated as being useful for this purpose. Light oils such as hydrocarbon oils boiling within the range of about 325° F. to about 400° F. are particularly preferred in the processing of animal feeds and food products for human consumption since this boiling range permits almost complete removal of the oil from the dried solids product. The usually preferred class of light oil is light hydrocarbon oil. The light hydrocarbon oil may be normal paraffinic, isoparaffinic, aromatic, or naphthenic. Examples of suitable light hydrocarbon oils are n-pentane, isopentane, lemonine, hexane, cyclohexane, benzene, isooctane, eicosane, petroleum fractions boiling in the range of from about 300° F. to about 450° F., isohexane, xylene, octadecane, toluene, n-heptane, cyclopentane, and mixtures thereof. Another class of suitable light oils is water-immiscible fatty alcohols. Examples of suitable alcohols are n-hexyl alcohol, n-heptyl alcohol, isoheptyl alcohol, n-octyl alcohol, iso-octyl alcohol, n-nonyl alcohol, and n-decyl alcohol. Fatty acids such as caproic acid, caprylic acid and capric acid as well as the methyl and ethyl esters of those acids may also be used as the light oil. In processing food products and animal feed, an FDA approved light oil such as the series of isoparaffinic oils manufactured by Humble Oil and Refining Company under the trademark "Isopar" may be used. Particularly preferred in processing animal feeds and food products for human consumption are Isopar H and Isopar L because their flash points permit safe operation and their boiling temperatures, which are in the range of about 325° F. to 400° F., allow for almost complete removal of the oil from the dried food product, thereby complying with FDA regulations. Generally, materials that are liquid at the temperature of operation, that are preferably oil-like and that are relatively volatile and essentially immiscible with water may be employed. It is often desirable to employ a light oil that imparts process credits such as waste oils normally found in sewage or industrial waste, or fuel oils, or, as suggested above, employ oils derived in the practice of the process itself so as to minimize cost factors. As in the case of heavy, relatively non-volatile fluidizing oil, the quantity of light fluidizing oil is in the range of about 2 to about 20 parts or more by weight for each part of non-fat or non-oil based solids.

The relatively light oils used to extract the residual relatively non-volatile fluidizing oils from solids dehydrated therein should be inert and miscible with the non-volatile oil to be extracted. They may or may not be water-immiscible. Like the light fluidizing oils, they should be sufficiently volatile to be evaporated by direct contact with a hot, inert blowing gas at a temperature within the range of from about 70° F. to about 400° F. The light oils used for extraction will generally have the same boiling ranges as given above for light fluidizing oils. The light fluidizing oils exemplified above are also suitable for the extraction of residual non-volatile oil. The quantity of light oil used for the extraction of residual non-volatile oil from the solids is not critical and is well within the purview of one skilled in the art to determine. The quantity of light oil will depend on such factors as, for example, degree of intimacy of contact of oil-laden solids with light oil; the quantity of oil-laden solids; the amount of residual oil sorbed on the solids which is a function of particle size, shape, and porosity; and the number of extractions of the oil-laden solids with the light oil.

While the dehydration step of this invention may be carried out in the single stage or single effect evaporators known in the art, it is preferred that this step be accomplished in a plurality of sequential heat evaporation steps wherein each of the successive evaporation steps is at a successively higher temperature and the resulting solids streams are of successively higher concentration because of increasing dehydration, the evolved vapors of each evaporation step supplying a substantial portion of the heat requirement of the preceding heat evaporation step. Thus the plurality of sequential heat evaporation steps connotes at least two. The temperatures, pressures and concentrations in each of the successive series of evaporation steps are largely empiric in nature, depending upon the systems and oils being employed. The normal processing temperatures for the dehydration of the fluidizing oil-aqueous solids mixture may be in the range of about 70° F. to about 250° F. in the first stage and in the range of about 100° F. to about 400° F. in the second, third or final stages of a multi-effect drying system. The preferred processing temperatures are in the range of about 90° F. to about 175° F. in the first stage and in the range of about 125° F. to about 350° F. in the second, third or last stages. The foregoing ranges and progressions of temperatures are reasonable in the case where the flows through the evaporator of the mixture being dehydrated and the heating or drying steam are substantially countercurrent, the evaporator in that mode of operation being called a "backward flow" evaporator. The temperatures also depend on the desired quality of the end product and the economics of fuel utilization, cooling water availability, capital investment, etc.

In the foregoing paragraph the expression "first stage" refers to that part of the evaporator equipment in which the fluidizing oil-aqueous solids mixture is subjected to the first step of a sequential plurality of evaporation steps, two or three or more corresponding to "second stage," "third stage," etc. The expression "effect," on the other hand, as in "multiple-effect" or "multi-effect," is related to the flow and action of the heating medium, customarily steam, in the evaporator equipment. Where the flow of a fluidizing oil-aqueous solids mixture being heated and evaporated is countercurrent to that of the heating steam (backward flow), the first stage of the evaporator is the same as its last effect.

The pressures are not critical and are controlled with temperatures to achieve desired evaporation rates in a given design. Thus the first stage pressure will conveniently be from about ¼ inch $H_g$ absolute to approximately atmospheric. The pressures then increase in successive stages responsive to the temperatures in the aforedescribed countercurrent or backward flow case. It is advantageous to operate the first stage at subatmospheric pressures and the final stages at close to atmospheric.

The advantage of the sequential evaporation steps may be seen from the following. For example, in a double-effect evaporator with feed entering at 80° F., the material can leave the evaporator at 225° F.-250° F. with ratios of approximately one pound of steam utilized for about 1.5 to 1.75 pounds of water evaporated; whereas in normal single-effect operations about 1.5 pounds of steam could be required to achieve the same result with only one pound of water evaporated. If triple or more effect evaporation be utilized, even further economies in fuel consumption are made possible. It should be noted that the evolved vapors from each of the heat evaporation steps after the first step supply a substantial portion of the heat requirements of the preceding heat evaporation step or stage in the case of a backward flow evaporator. The only net or external heat input required is that needed to raise the temperature of the components to evaporation temperatures and to provide heat of vaporization as well as to make good for heat losses. The final product from the dehydration step is generally a substantially anhydrous oil-solids slurry containing no more than about 5-10% weight percent water on a non-fat basis.

Although backward flow evaporators are preferred, any type may be used. Thus, backward flow evaporators, forward flow evaporators, forward flow-backward flow evaporator combinations or, indeed, any combination thereof may be used. The equipments that are generally preferred are multiple-effect evaporators known in the art, e.g., Mojonnier, Bufflovac, Rodney-Hunt, recompression type evaporators such as thermal or mechanical recompression types, etc. Functionally, evaporator equipment may be of the forced circulation, flash, falling film recirculation, single pass, rotary wiped film, plate, or, indeed, any suitable type.

The separation of solids from fluidizing oil may, in the case of a light fluidizing oil, be conveniently carried out by gravity separation. In the case of either light or heavy fluidizing oil, separation of solids may be carried out in a liquid-solids separating means, preferably in a dynamic press such as a centrifuge. When dehydration is carried out in a light fluidizing oil, the concentrated oil-solids slurry or solids having residual light oil sorbed thereon which are recovered from the liquid-solids separating means, e.g., centrifuge, are then brought into direct contact with hot, inert blowing gas for removal of the residual light oil therefrom. Any residual heavy oil that may be present on the solids is essentially not removed by contact with the blowing gas. On the other hand, when dehydration is carried out in a heavy, relatively non-volatile oil, the solids having residual heavy oil sorbed thereon which are recovered from the liquid-solids separating means, e.g., centrifuge, are extracted with a light oil. The extraction to remove residual heavy oil may advantageously be carried out in the centrifuge. This may be accomplished, for example, in a single extraction using a continuous screen bowl centrifuge where the non-volatile fluidizing oil is separated from the solids in the first stage of the centrifuge and the oil-laden solids are extracted with the relatively light oil in the second stage, screen bowl portion of the centrifuge. The solids having residual light oil sorbed thereon which are recovered from the centrifuge after the extraction step are then brought into direct contact with hot, inert blowing gas for the removal of the residual light oil therefrom.

In the embodiment of the invention exemplified in FIG. 1, light oil-laden solids exiting from the centrifuge in a system employing a light fluidizing oil in the dehydration step enter a deoiler apparatus operating at essentially atmospheric pressure where they are brought into direct contact with a hot, inert blowing gas. The blowing gas is gaseous products of combustion from the furnace used to heat the boiler of FIG. 1 which supplies steam for the dehydration step and other uses. The deoiler apparatus may, if desired, be externally heated as by passing steam through a heating jacket surrounding it. The vaporized light oil and effluent blowing gas are conducted from the deoiler apparatus and the light oil vapor may advantageously be condensed and separated from the effluent gas.

Figure 2:
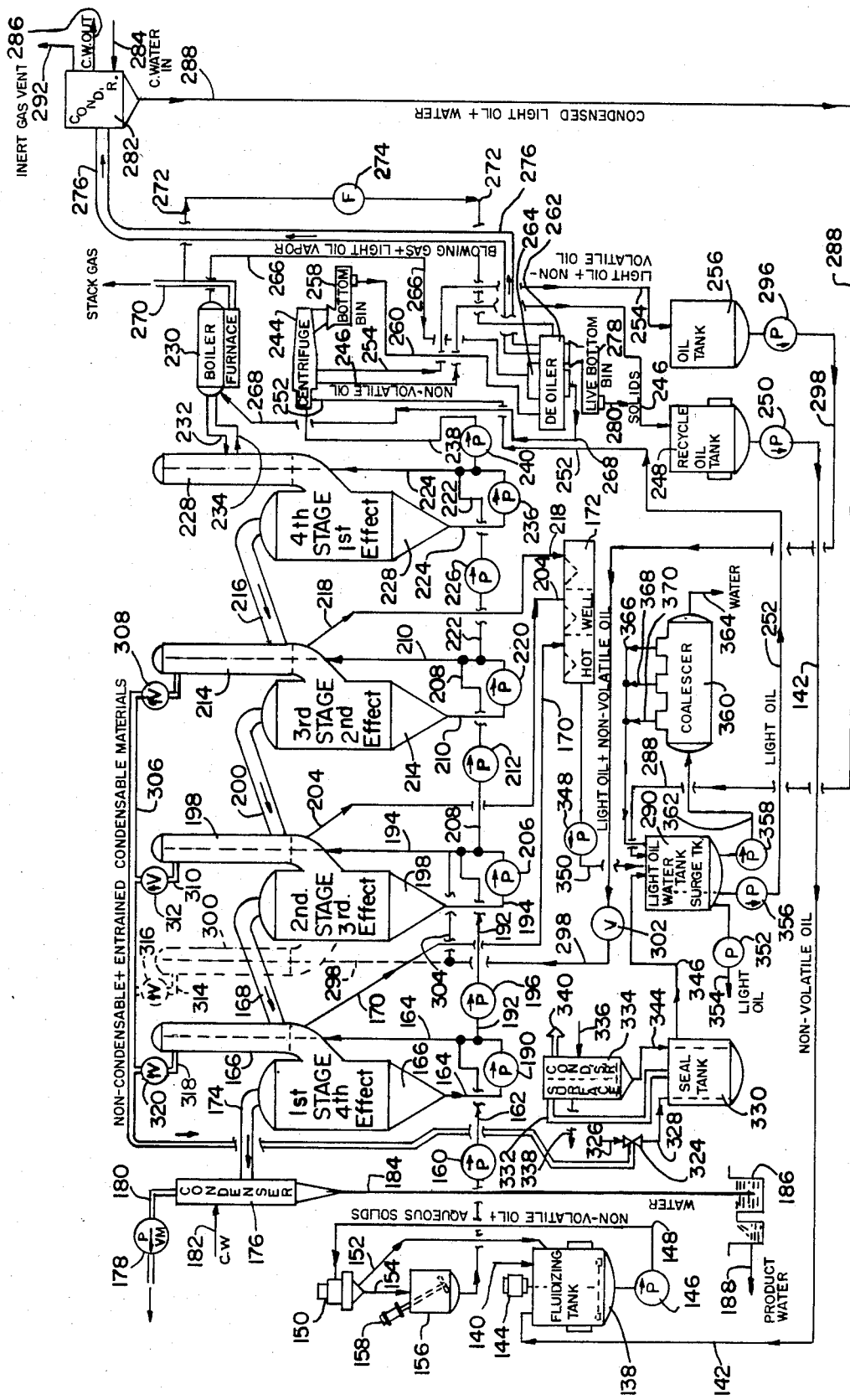
FIG. 2 illustrates the apparatus of the embodiment of the invention wherein a mixture of aqueous solids in a relatively non-volatile fluidizing oil is subjected to dehydration by heat evaporation followed by separation of the major portion of the non-volatile oil from the essentially anhydrous solids. The essentially anhydrous solids have sorbed thereon appreciable amounts of reelatively non-volatile oil which is removed by extraction with a relatively volatile light oil. Said solids, containing residual light oil, are brought into direct contact in a deoiler apparatus with gaseous products of combustion from a furnace. The gaseous products of combustion act as hot, inert blowing gas to bring about the separation of residual light oil from said solids.

In the embodiment depicted in FIG. 2, solids containing residual non-volatile fluidizing oil are extracted in a centrifuge with a light oil to remove the heavy, relatively non-volatile oil therefrom. Light oil-laden solids exiting from the centrifuge enter a deoiler apparatus where they are brought into direct contact with a hot, inert blowing gas. The blowing gas is gaseous products of combustion from the furnace used to heat the boiler of FIG. 2 which supplies steam for the dehydration as well as for the heating jacket of the deoiler apparatus. Vaporized light oil and effluent blowing gas are conducted from the deoiler apparatus. The light oil vapor may advantageously be condensed and separated from the effluent blowing gas.

Figure 3:
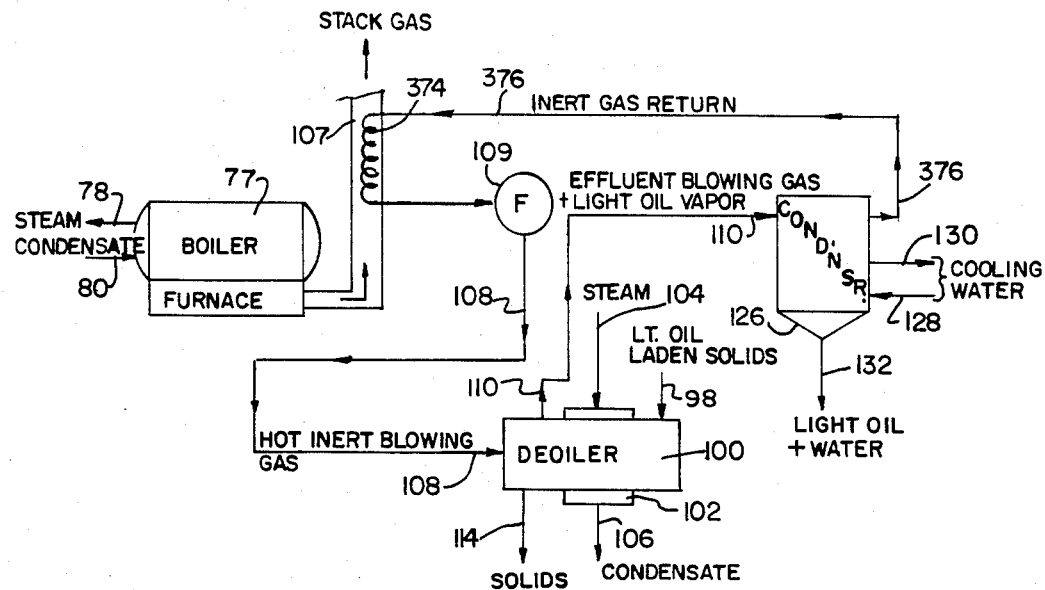
FIG. 3 depicts a portion of a modified apparatus of FIG. 1 or FIG. 2 wherein the hot, inert blowing gas is an inert gas heated in the furnace of the apparatus or in a heating device not otherwise associated with the apparatus of FIG. 1 or FIG. 2.

In the embodiment illustrated in FIG. 3, an inert gas other than gaseous products of combustion is heated in a furnace and thereafter brought into direct contact with light oil-laden solids in a deoiler apparatus. Again, vaporized light oil and effluent blowing gas are conducted from the deoiler apparatus.

Figure 4:
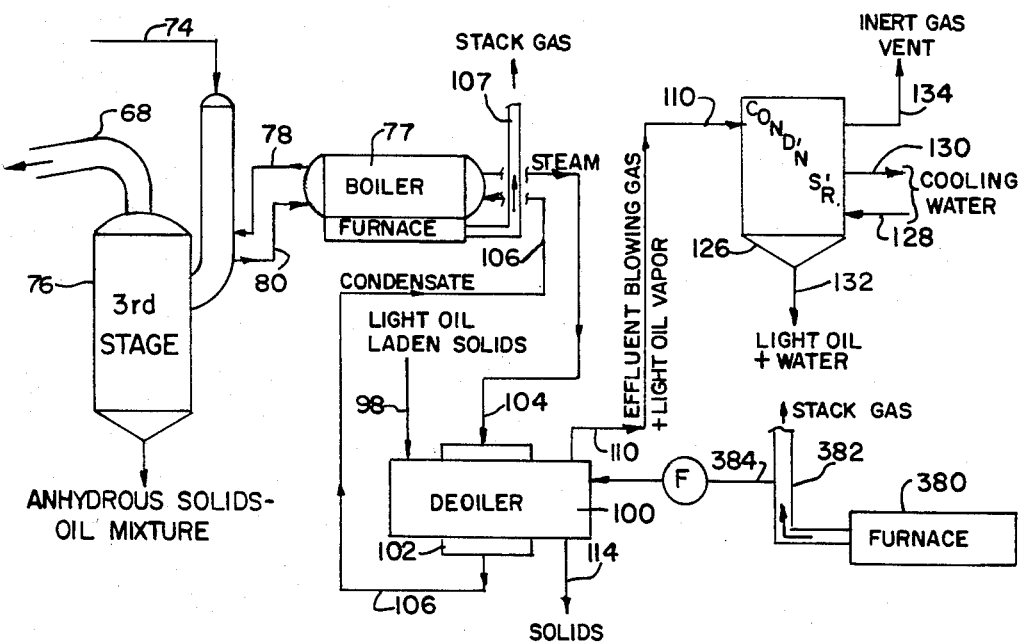
FIG. 4 depicts a portion of a modified apparatus of FIG. 1 or FIG. 2 wherein the hot, inert blowing gas is gaseous products of combustion from a furnace not otherwise associated with the apparatus of FIG. 1 or FIG. 2.

In the embodiment depicted in FIG. 4, the hot, inert blowing gas is gaseous products of combustion from a furnace not otherwise associated with the system, e.g., it is not the furnace used to heat the boiler which supplies steam for dehydrating a mixture of aqueous solids in fluidizing oil by evaporation. The hot, gaseous combustion products are directly contacted with light oil-laden solids in a deoiler apparatus. Effluent blowing gas and light oil vapor are conducted from the deoiler apparatus.

This invention will be most clearly perceived and best understood through reference to the preferred embodiments as discussed in further detail in connection with the flow diagrams shown in the drawings. In the embodiment illustrated in FIG. 1, a stream of aqueous solids in solution or dispersion enters fluidizing tank 10 through line 12. Light fluidizing oil enters fluidizing tank 10 through line 14. The fluid mixture in fluidizing tank 10 is agitated by means of stirring device 16 and then withdrawn from the fluidizing tank by means of pump 18. Pump 18 delivers the mixture through line 20 to the evaporating region of the first stage or third effect evaporator 22 of an overall drying evaporator assembly or array. In evaporator 22 water and a portion of the light oil are boiled off at a subatmospheric pressure which may typically be about 2 to 10 inches Hg absolute. The temperature of the partially dehydrated and partially deoiled product of the entering mixture of aqueous solids in light oil is in the range of about 70°–250° F. and preferably about 90°–175° F., depending on the pressure in the evaporator. The system is heated by mixed steam and light oil vapor from line 24 which is at a temperature about 30°–40° F. higher than the temperature of the partially dehydrated aqueous solids in oil mixture and which comes from the vapor chamber of the succeeding or second stage of the evaporator. Condensate of the heating vapor is withdrawn through line 26 which meets line 28 at a T-joint or connection. The condensate is conducted through line 28 to oil-water separator 30. Mixed steam-light oil vapor formed as a result of the partial dehydration of the entering mixture of aqueous solids in light oil is removed from the vapor chamber of evaporator 22 through line 34 into surface condenser 36 within which a partial vacuum is maintained by means of vacuum pump 38 which is connected to surface condenser 36 via vacuum line 40.

The mixture of water and light oil vapors entering surface condenser 36 through line 34 is condensed by cooling water entering the condenser through line 42 and leaving the condenser through line 44. The mixed condensate of warm water and light oil is discharged from the condenser through line 46 into oil-water separator 30.

Inside oil-water separator 30, the mixture of water and light oil, including the mixture returned from condenser 126 mentioned hereinafter, is separated into light oil and partially clarified water containing some light oil. The separated light oil is removed from oil-water separator 30 through line 48 and is conducted thereby to light oil storage tank 50.

The partially clarified water is conducted from oil-water separator 30 via line 54 to coalescer 56. Inside coalescer 56, the partially clarified water containing some light oil is separated into light oil and clean product water. The separated light oil is withdrawn from coalescer 56 through line 58, which meets line 48 at a T-joint, and is ultimately conducted to light oil storage tank 50. Clean product water is withdrawn from coalescer 56 through line 60. If desired, part of the product water may be reused throughout the system. Alternatively, all the recovered water may be stored in a reservoir for later use in applications in which essentially clean water is required.

The partially dehydrated mixture of aqueous solids in light oil from evaporator 22 is continuously removed through line 62 with the assistance of pump 64. The partially dehydrated mixture is forced through line 62 to the evaporating region of second stage 66 of the evaporator. In the second stage evaporator a procedure is followed which is similar to that in the first stage except that the pressure is higher. The pressure in each succeeding evaporator stage is somewhat higher than in the preceding stage, approaching atmospheric pressure in the last stage. The temperature of the further dehydrated product of the second stage evaporator is in the range of about 100°–400° F. and preferably about 125°–350° F., depending upon the pressure in the evaporator. The heating medium is mixed steam and light oil vapor which is at a temperature about 30°–40° F. higher than the temperature of the further dehydrated aqueous solids slurry leaving the second stage evaporator. The mixed heating vapor comes through line 68 from the vapor chamber of the third or succeeding evaporator stage. Condensate of the mixed heating vapor is withdrawn from second stage evaporator 66 through line 28 and is discharged into oil-water separator 30. As mentioned above, mixed steam-light oil vapor formed as a result of the further dehydration of the partially dehydrated mixture of aqueous solids in light oil is removed from the vapor chamber of second stage evaporator 66 through line 24 and is used as the heating medium in first stage evaporator 22.

The further dehydrated slurry of aqueous solids in light oil withdrawn from second stage evaporator 66 is discharged by pump 70 through line 74. The further dehydrated mixture is conducted through line 74 to the evaporating region of third stage 76 of the evaporator. The pressure in the third stage is higher than in the second stage, advantageously being approximately atmospheric. The temperature of the product of third stage evaporator 76, i.e., a slurry of solids in light oil containing about 1% by weight of water based on the entire slurry, is greater than that of second stage evaporator 66 and is within the range of about 100°–400° F. and preferably about 150°–350° F. The heating medium for third stage evaporator 76 is steam at a temperature about 30°–50° F. higher than that of the product, i.e., an essentially anhydrous slurry of solids in light oil. This steam is generated in boiler-furnace 77 and conveyed to third stage 76 of the evaporator through line 78. Condensate of the heating steam is withdrawn through line 80 and returned to the boiler-furnace. As already mentioned, mixed steam-light oil vapor formed as a result of the still further dehydration of the slurry of solids in light oil is removed from the vapor chamber of third stage evaporator 76 through line 68 is used as the heating medium in second stage evaporator 66.

The essentially anhydrous slurry of solids in light oil is withdrawn from third stage evaporator 76 and is forced by pump 82 through line 84 to continuous centrifuge 86. The light oil is separated from the solids in centrifuge 86 and is conducted therefrom via line 88 to light oil storage tank 50. Recovered light fluidizing oil is discharged by pump 90 through line 14 to fluidizing tank 10 for recycling through the system. If the process provides a net yield of oil, it may be recovered from tank 50 and stored for use outside the system.

The solids, having residual light oil sorbed thereon, exit from continuous centrifuge 86 and enter live bottom bin 94 via conduit 96. The live bottom of bin 94 causes the solids to advance to the exit thererof where they are conducted by gravity through conduit 98 into cake deoiler apparatus 100. Deoiler apparatus 100 may, if desired, be externally heated by steam generated in boiler-furnace 77 which enters steam jacket 102 through line 104. Condensate of the jacket steam is withdrawn through line 106 and returned to the boiler-furnace. Hot, gaseous products of combustion generated in the furnace of boiler-furnace 77 are discharged through furnace stack 107. At least a portion of the hot, gaseous products of combustion are conducted from furnace stack 107 through line 108, which is joined thereto, into deoiler apparatus 100 where, as inert blowing gas, they come into direct contact with the light oil-laden solids and cause vaporization of said light oil. Fan 109 in line 108 provides pressure to conduct the gaseous products of combustion through line 108. Effluent blowing gas and vaporized light oil exit from the deoiler apparatus through line 110. It will be understood that the point at which line 108 joins furnace stack 107 will be determined by the desired temperature of the gaseous products of combusion, i.e., inert blowing gas. The higher the desired temperature, the lower will be the point on furnace stack 107 where line 108 joins. If maximum blowing gas temperatures are desired, line 108 may be connected to the furnace itself of boiler-furnace 77.

Considered together, the furnace itself and the furnace stack may be termed the heating region of the boiler-furnace; that is, the region in which, in operation, products of combustion are present. That region is distinguished from the boiler region or steam side of the boiler-furnace where, in operation, water and steam are present.

The solids, free from sorbed light oil, are discharged by gravity from deoiler apparatus 100 through conduit 114 into live bottom bin 116. The screw conveyor bottom of bin 116 conducts the solids to the exit thereof where said solids, free from the fluidizing light oil as well as being in an essentially anhydrous state, are discharged through line 118 into grinder or comminutor 119. By means of grinder 119 the solids are reduced to granular if not powder form, and from the grinder they flow through line 120 to a rotary selector valve 121 by which they may be directed to either line 122 or line 123. Line 122 leads to collecting or bagging equipment, and through it the solids may be withdrawn for use outside the illustrated system. Line 123, shown as active according to the setting of valve 121, leads to the suction of blower 124, and this blower discharges the comminuted solids to the combustion region of boiler-furnace 77 through line 125.

The effluent blowing gas and vaporized light oil exiting from deoiler apparatus 100 are conducted by line 110 into surface condenser 126. Light oil vapors entering surface condenser 126 through line 110 are condensed by cooling water entering the condenser through line 128 and leaving the condenser through line 130. The condensed light oil and any associated water resulting from condensation of water vapor carried over from the product solids and/or that associated with the inert gas which is stack gas in this case are discharged from the condenser through line 132 into oil-water separator 30. Cooled effluent blowing gas is discharged from the condenser into the atmosphere through line 134. Since effluent blowing gas is freely discharged from the condenser into the atmosphere, the pressure in deoiler apparatus 100 is essentially atmospheric. The deoiling step is therefore conducted at essentially atmospheric pressure. While the effluent blowing gas and the vaporized light oil from deoiler apparatus 100 are depicted in FIG. 1 as being conducted to condenser 126 where the oil vapor is condensed and separated from the effluent blowing gas, it will be understood that the energy of the blowing gas, light oil vapor mixture may be recovered by supplying heat to first stage evaporator 22 or second stage evaporator 66 or, indeed, to any evaporating stage in the system except to the shell-side of third stage evaporator 76 since the oil contained therein would contaminate the condensate returned to boiler-furnace 77 through line 80 and also since the temperature of the mixture may not be sufficiently high to provide for the heat transfer requirements. Alternatively, the effluent blowing gas and vaporized light oil may be used for preheating the aqueous solids-light fluidizing oil mixture by injection into fluidizing tank 10 or, indeed, at any other location in the system where recovery of its energy can offer process credits.

The foregoing description of FIG. 1 applies to the case where the aqueous solids do not initially contain a heavy, relatively non-volatile oil. If there had been a heavy, relatively non-volatile oil originally associated with the aqueous solids, the heavy oil would have been extracted by the light fluidizing oil during the pressing operation. In this embodiment depicted in FIG. 1, the entire oil fraction from the pressing operation is recycled as fluidizing oil. Accordingly, if a heavy oil were present an equilibrium would soon be attained wherein heavy oil was extracted from the aqueous solids by the fluidizing oil at the same rate it was replaced by the recycles oil. The net result would be an essentially dry solids product having substantially the same heavy oil as that of the original feed on a moisture-free basis.

FIG. 2 depicts the embodiment of the invention wherein a mixture of aqueous solids in a relatively non-volatile fluidizing oil is subjected to dehydration by heat evaporation followed by separation of the major portion of the non-volatile oil from the essentially anhydrous solids. The essentially anhydrous solids have sorbed thereon residual relatively non-volatile oil which is removed by extraction with a relatively volatile light oil. The solids, containing residual light oil, are thereafter brought into direct contact in a deoiler apparatus with gaseous products of combustion from a furnace.

In the embodiment of the process employing the apparatus depicted in FIG. 2, a stream of aqueous solids in solution or dispersion enters fluidizing tank 138 through line 140. Non-volatile fluidizing oil enters fluidizing tank 138 through line 142. The fluid mixture in fluidizing tank 138 is agitated by means of stirring device 144 and then withdrawn from the fluidizing tank by means of pump 146. Pump 146 delivers the mixture through line 148 to fine grinder 150 where solid particles are ground to a maximum size of about one-fourth inch. Part of the output from grinder 150, such as hard to grind materials, is recycled to fluidizing tank 138 through line 152 while the remainder of the output is conducted through line 154 to feed tank 156. The fluid mixture in feed tank 156 is agitated by means of stirring device 158 and then withdrawn from the feed tank by means of pump 160. Pump 160 delivers the fluid mixture through line 162 which meets line 164 at a T-joint or connection. The fluid mixture is conducted through line 164 to the first stage or fourth effect evaporator 166 of an overall drying evaporator assembly or array. In evaporator 166, water is boiled off at a subatmospheric pressure which may typically be about 2 to 10 inches Hg absolute. The temperature of the partially dehydrated product of the entering mixture of aqueous solids in non-volatile fluidizing oil is in the range of about 70°–250° F. and preferably about 90°–175° F., depending on the pressure in the evaporator. The system is heated by vapor from line 168 which is at a temperature about 30°–40° F. higher than the temperature of the partially dehydrated aqueous solids in oil mixture. Condensate of the heating vapor is withdrawn through line 170 to hot well 172. Water vapor formed as a result of the partial dehydration of the entering mixture of aqueous solids in non-volatile oil is removed from the vapor chamber of evaporator 166 through line 174 into barometric condensor 176 within which a partial vacuum is maintained by means of vacuum pump 178 which is connected to condenser 176 via vacuum line 180.

Water vapor entering condenser 176 through line 174 is mixed with and condensed by cooling water entering the condenser through line 182, and the resulting stream of warm water is discharged through line 184 into hot well 186. From hot well 186, product water is drawn off through barometric discharge line 188. If desired, part of the product water may be reused throughout the system. Alternatively, all the recovered water may be stored in a reservoir for later use in applications in which essentially clean water is required.

The partially dehydrated mixture of aqueous solids in oil from evaporator 166 is continuously removed through line 164 with the assistance of pump 190. Line 164 meets line 192 at a T-joint whereby part of the mixture discharged from evaporator 166 through line 164 is recycled through line 164 back to evaporator 166 and part of the mixture enters line 192 which meets line 194 at a T-joint. Pump 196 forces the partially dehydrated mixture through line 192 and ultimately line 194 to second stage 198 of the evaporator. In the second stage evaporator a procedure is followed which is similar to that in the first stage except that the pressure is generally higher. The pressure in each succeeding evaporator stage is usually somewhat higher than in the preceding stage, approaching approximately atmospheric pressure in the last stage. The temperature of the further dehydrated product of the second stage evaporator is in the range of about 100°–400° F. and preferably about 200°–350° F., depending upon the pressure in the evaporator. The heating medium is steam which is at a temperature about 30°–40° F. higher than the temperature of the further dehydrated aqueous solids slurry leaving the second stage evaporator. The heating steam comes through line 200 from the vapor chamber of the third or succeeding evaporator stage. Condensate of the heating steam is withdrawn through line 204 and is discharged into hot well 172.

The further dehydrated slurry of aqueous solids in oil withdrawn from second stage evaporator 198 is discharged through line 194 by pump 206. Line 194 meets line 208 at a T-joint whereby part of the slurry discharged from evaporator 198 through line 194 is recycled through line 194 back to evaporator 198 and part of the mixture enters line 208 which meets line 210 at a T-joint. Pump 212 forces the further dehydrated mixture through line 208 and ultimately through line 210 to third stage 214 of the evaporator. The pressure in the third stage is generally higher than that in second stage evaporator 198 but is advantageously somewhat less than atmospheric. The temperature of the still further dehydrated mixture of aqueous solids in oil leaving the third stage of the evaporator is within the range of about 100°–400° F., preferably about 200°–350° F., and is usually somewhat higher than that from second stage evaporator 198. The heating medium is steam at a temperature about 30°–50° F. higher than that of the product, and it comes from the vapor chamber of the succeeding or fourth stage of the evaporator through line 216. Condensate of the heating steam is withdrawn through line 218 and is discharged into hot well 172.

The still further dehydrated slurry of solids in oil withdrawn from third stage evaporator 214 is discharged by pump 220 through line 210. Line 210 meets line 222 at a T-joint whereby part of the mixture discharged from evaporator 214 through line 210 is recycled through line 210 back to evaporator 214 and part of the mixture enters line 222 which meets line 224 at a T-joint. Pump 226 forces the slurry through line 222 and ultimately line 224 to fourth stage 228 of the evaporator. The pressure in the fourth stage is usually higher than in the third stage, advantageously being approximately atmospheric. The temperature of the product of fourth stage evaporator 228, i.e., a slurry of solids in oil containing about 1 percent by weight of water based on the entire slurry, is generally greater than that of the product of third stage evaporator 214 and is within the range of about 100°–400° F. and preferably about 200°–350° F. The heating medium is steam at a temperature about 30°–50° F. higher than that of the product, i.e., an essentially anhydrous slurry of solids in oil. This steam is generated in a boiler-furnace 230 and conveyed to fourth stage 228 of the evaporator through line 232. Condensate of the heating steam is withdrawn through line 234 and returned to the boiler-furnace 230.

The essentially anhydrous slurry of solids in oil withdrawn from fourth stage evaporator 228 is discharged by pump 236 through line 224. Line 224 meets line 238 at a T-joint whereby part of the mixture discharged from evaporator 228 through line 224 is recycled through line 224 back to evaporator 228 and part of the mixture enters line 238. Pump 240 forces the slurry through line 238 to continuous centrifuge 244 which is fitted with a solid bowl first section and a screen bowl second section. The gross or greater part of the relatively non-volatile fluidizing oil is separated from the solids in the solid bowl first section of centrifuge 244 and is conducted therefrom via line 246 to recycle fluidizing oil tank 248. Recovered fluidizing oil is discharged by pump 250 through line 142 to fluidizing tank 138 for recycling through the system. If the process provides a net yield of fluidizing oil, it may be recovered from recycle oil tank 248 and stored for use outside the system.

The solids, containing residual fluidizing oil sorbed thereon, move from the solid bowl first section of centrifuge 244 to the screen bowl second section of the centrifuge. A relatively volatile, low viscosity light oil is conducted through line 252 into the screen bowl section of centrifuge 244 where it comes into intimate contact with the solids having residual fluidizing oil sorbed thereon. The relatively light oil extracts the fluidizing oil from the solids in the screen bowl section of centrifuge 244, and the mixture of light oil and extracted fluidizing oil is conducted from the centrifuge through line 254 to tank 256.

The solids, having residual relatively light oil sorbed thereon, exit from the screen bowl section or centrifuge 244 and enter live bottom bin 258. The live bottom of bin 258 causes the solids to advance to the exit thereof where they fall by gravity through conduit 260 into cake deoiler apparatus 262. Deoiler apparatus 262 may, if desired, be externally heated by steam generated in boiler-furnace 230 which enters steam jacket 264 through line 266. Condensate of the jacket steam is withdrawn through line 268 and returned to boiler-furnace 230. Hot, gaseous products of combustion generated in the furnace of boiler-furnace 230 are discharged through furnace stack 270. At least a portion of the hot, gaseous products of combustion are conducted from furnace stack 270 through line 272, which is joined thereto and which may include a dust collector of any suitable design, into deoiler apparatus 262 where, as inert blowing gas, they come into direct contact with the light oil-laden solids and cause vaporization of said light oil. Pan 274 in line 272 provides pressure to conduct the gaseous products of combustion through line 272. Effluent blowing gas and vaporized light oil exit from the deoiler apparatus through line 276. It will be understood that the point at which line 272 joins furnace stack 270 will be determined by the desired temperature of the gaseous products of combustion, i.e., inert blowing gas. The higher the desired temperature, the lower will be the point on furnace stack 270 where line 272 joins. If maximum blowing gas temperatures are desired, line 272 may be connected to the furnace itself of boiler-furnace 230. A heating region and a boiler region are defined for boiler-furnace 230 as for boiler-furnace 77.

The solids, free from sorbed light oil, are discharged by gravity from deoiler apparatus 262 into live bottom bin 278. The screw conveyor bottom of bin 278 conducts the solids to the exit thereof where said solids, free from fluidizing oil and light oil as well as being in an essentially dry state, are discharged through line 280.

Effluent blowing gas and vaporized light oil exiting from deoiler apparatus 262 are conducted by line 276 into surface condenser 282. Light oil vapors entering surface condenser 282 through line 276 are condensed by cooling water entering the condenser through line 284 and leaving the condenser through line 286. The condensed light oil and any incidentally associated water are discharged from the condenser through line 288 into tank 290 which is divided into a light oil-water tank and a light oil surge tank. Cooled effluent blowing gas is discharged from the condenser into the atmosphere through line 292. Since effluent blowing gas is freely discharged from the condenser into the atmosphere, the pressure in the deoiler apparatus 262 is essentially atmospheric. The deoiling step is therefore conducted at essentially atmospheric pressure. While the effluent blowing gas and the vaporized light oil from deoiler apparatus 262 are depicted in FIG. 2 as being conducted to condenser 282 where the oil vapor is condensed and separated from effluent blowing gas, it will be understood that the energy of the blowing gas-light oil vapor mixture may be recovered by supplying heat to any evaporating stage in the system except to the shellside of fourth stage evaporator 228 since the oil contained therein would contaminate the condensate returned to boiler-furnace 230 through line 234 and also since the temperature of the mixture may not be sufficiently high to provide for the heat transfer requirements. Alternatively, the effluent blowing gas and vaporized light oil may be used for preheating the aqueous solids-fluidizing oil mixture by injection into fluidizing tank 138 or, indeed, at any other location in the system where recovery of its energy can offer process credits.

The mixture of relatively light oil and extracted fluidizing oil in tank 256 is discharged by pump 296 through line 298 to evaporator tube bundle 300 on second stage evaporator 198. The rate of flow through line 298 is controlled by valve 302. The extracted fluidizing oil fraction becomes combined with the partially dehydrated slurry of solids in oil that is withdrawn from second stage evaporator 198 through line 194 while the relatively light oil is vaporized and, along with the steam, is conducted from the vapor chamber of second stage evaporator 198 through line 168 to serve as the heating medium in first stage evaporator 166. It will again be understood that those skilled in the art that independent evaporator tube bundle 300 need not be used but that the mixture of light oil and extracted fluidizing oil may be discharged from tank 256 to any evaporating stage in the system.

Line 304 is connected by a T-joint at one end to line 194 and by a T-joint at its other end to line 298. The rate of flow of light oil and extracted fluidizing oil through line 298, as well as the pressure in line 298, are controlled by valve 302 so that part of the slurry of aqueous solids in oil passing through line 194 is shunted through line 304 to line 298 and ultimately to evaporator tube bundle 300 where said slurry is subjected to further evaporation.

From the top of the evaporating region of third stage evaporator 214 extends line 306 through which are conducted non-condensable materials plus entrained condensable material. Access to line 306 is controlled by valve 308. Line 310, controlled by valve 312, leads from the top of the evaporating region of second stage evaporator 198 to line 306 which it joins at a T-joint. Similarly, line 314, controlled by valve 316, connects the top of independent evaporating region 300 to line 306 and line 318, controlled by valve 320, connects the top of the evaporating region of first stage evaporator 166 to line 306. A partial vacuum is maintained in line 306 by means of ejector 324 which is supplied with steam through line 326. By adjusting valves 308, 312, 316 and 320, the desired degrees of reduced pressure may be maintained, respectively, in the third, second, and first stages of the evaporator.

Steam from ejector 324 as well as non-condensable and condensable materials are conducted through line 328 to condensables seal tank 330. Non-condensable materials and entrained condensable materials are conducted by line 332 from condensables seal tank 330 to surface condenser 334. Surface condenser 334 is cooled by cooling water entering the condenser through line 336 and leaving through line 338. Non-condensable materials exit from surface condenser 334 through line 340. Entrained condensable materials are returned to condensables seal tank 330 from surface condenser 334 through line 344. Condensable materials, essentially comprising water and the relatively light oil, are conducted by line 346 from condensables seal tank 330 to tank 290 which, as mentioned above, is divided into a light oil-water tank and a light oil surge tank. Condensate, essentially comprising water and the light oil, is forced by pump 348 from hot well 172 to tank 290 through line 350.

Inside tank 290, the mixture of water and relatively light oil is separated into essentially pure light oil which enters the light oil surge tank and partially clarified water containing some light oil which remains in the light oil-water tank. Excess light oil is forced by pump 352 through line 354 from the light oil surge tank part of the tank 290 to storage tanks. Light oil needed in the process to extract fluidizing oil from the solids is forced by pump 356 from the light oil surge tank part of the tank 290 through line 252 to continuous centrifuge 244.

Partially clarified water containing some of the relatively light oil is forced by pump 358 from the light oil-water tank part of tank 290 to coalescer 360 through line 362. Clarified condensate comprising clean water is removed from coalescer 360 through line 364 and conducted to storage tanks. Light oil which is separated from the water in coalescer 360 is removed from the coalescer through line 366 and through lines 368 and 370 which connect with line 366 at T-joints. Line 366 conducts the light oil back to tank 290 where it enters the light oil surge tank part thereof and ultimately goes to storage tanks or is conducted to continuous centrifuge 244 for the purpose of extracting fluidizing oil from the solids.

FIG. 3 depicts a portion of the apparatus used in a modification of the apparatus of FIG. 1 or of FIG. 2 wherein the hot, inert blowing gas is an inert gas heated in the furnace of the apparatus or, alternatively, in a heating device not otherwise associated with the apparatus of FIG. 1 or of FIG. 2. The apparatus of FIG. 3 differs basically from that of FIG. 1 and of FIG. 2 in that the hot, inert blowing gas is not gaseous products of combustion but rather is an inert gas such as nitrogen or carbon dioxide. FIG. 3 is depicted as a modification of the apparatus of FIG. 1, but it will be understood that the same modification could just as readily be applied to the apparatus of FIG. 2. Also, while FIG. 3 illustrates the use of boiler-furnace 77 of FIG. 1 as the means for heating the inert gas, it will be understood that the inert gas may alternatively be heated in a heating device not otherwise associated with the apparatus of FIG. 1.

In FIG. 3, light oil-laden solids enter a cake deoiler apparatus 100 via conduit 98. Deoiler apparatus 100 may be externally heated by steam generated in boiler-furnace 77 which enters steam jacket 102 through line 104. Condensate of the jacket steam is withdrawn through line 106 and returned to the boiler-furnace. An inert gas within heating coil 374 is heated inside furnace stack 107 of boiler-furnace 77. Heating coil 374 is joined at one end to line 108 which conducts the hot, inert blowing gas into deoiler apparatus 100 where it comes into direct contact with the light oil-laden solids and causes vaporization of the light oil. Solids, free from sorbed light oil, are discharged from deoiler apparatus 100 through conduit 114. Fan 109 in line 108 provides pressure to conduct the hot, inert blowing gas through line 108. Effluent inert blowing gas and vaporized light oil exit from the deoiler apparatus through line 110. It will be understood by those skilled in the art that the position of heating coil 374 in furnace stack 107 will be determined by the desired temperature of the inert blowing gas. The higher the desired temperature, the lower will be the position of heating coil 374 in furnace stack 107. If maximum inert blowing gas temperatures are desired, heating coil 374 may be placed inside the furnace of boiler-furnace 77.

Effluent blowing gas and vaporized light oil exiting from deoiler apparatus 100 are conducted by line 110 into surface condenser 126. Light oil vapors entering surface condenser 126 through line 110 are condensed by cooling water entering the condenser through line 128 and leaving the condenser through line 130. The condensed light oil is discharged from the condenser through line 132. Cooled effluent inert blowing gas is discharged from condenser 126 through line 376 which is connected to the other end of heating coil 374. The inert blowing gas is accordingly recycled.

FIG. 4 depicts a portion of a modified apparatus of FIG. 1 or of FIG. 2 wherein the hot, inert blowing gas is gaseous products of combustion from a furnace not otherwise associated with the apparatus of FIG. 1 or of FIG. 2. While FIG. 4 is representative of a modification of the apparatus of FIG. 1, it will be understood that the same modification could be applied to the apparatus of FIG. 2.

In FIG. 4, light oil-laden solids enter cake deoiler apparatus 100 via conduit 98. Deoiler apparatus 100 may, if desired, be externally heated by steam generated in boiler-furnace 77 which enters steam jacket 102 through line 104. Condensate of the jacket steam is withdrawn through line 106 and returned to boiler-furnace 77. Steam for heating the evaporator array of the system is also generated in boiler-furnace 77 and conducted to third stage 76 of the evaporator through line 78. Condensate of the heating steam is withdrawn through line 80 and returned to the boiler-furnace.

Hot, gaseous products of combustion are generated in combustion apparatus or furnace 380, which may indeed be an industrial inert gas generator of known design, and discharged through furnace stack 382. At least part of the hot, gaseous products of combustion are conducted from furnace stack 382 via line 384, which is joined to furnace stack 382, into deoiler apparatus 100 where, as inert blowing gas, they come into direct contact with the light oil-laden solids and cause vaporization of the light oil. Solids, free from sorbed light oil, are discharged from deoiler apparatus 100 through conduit 114. Fan 386 in line 384 provides pressure to conduct the gaseous products of combustion through line 384. Effluent blowing gas and vaporized light oil exit from the deoiler apparatus through line 110. As mentioned above, the point at which line 384 is joined to furnace stack 382 will be determined by the desired temperature of the gaseous products of combustion. Thus, the higher the desired temperature of the gaseous products of combustion, the lower will be the point on furnace stack 382 where line 384 joins. For maximum blowing gas temperature, line 384 will be connected directly to the furnace. A heating region is defined for furnace 380 as for boiler-furnace 77.

Effluent blowing gas and vaporized light oil exiting from deoiler apparatus 100 are conducted by line 110 into surface condenser 126. Light oil vapors entering surface condenser 126 through line 110 are condensed by cooling water entering the condenser through line 128 and leaving the condenser through line 130. The condensed light oil is discharged from the condenser through line 132. Cooled effluent blowing gas is discharged from the condenser into the atmosphere through line 134. Since effluent blowing gas is freely discharged from the condenser into the atmosphere, the pressure in deoiler apparatus 100 is essentially atmospheric. The deoiling step is therefore conducted at essentially atmospheric pressure.

While the effluent blowing gas and the vaporized light oil from deoiler apparatus 100 are depicted in FIG. 4 as being conducted to condenser 126 where the oil vapor is condensed and separated from effluent blowing gas, it will be understood that the energy of the blowing gas-light oil vapor mixture may be recovered by supplying heat to first stage evaporator 22, to second stage evaporator 66 or to any evaporating stage in the system except to the shellside of third stage evaporator 76 since the oil contained therein would contaminate the condensate returned to boiler-furnace 77 through line 80 and also since the temperature of the mixture may not be sufficiently high to provide for the heat transfer requirements. Alternatively, the effluent blowing gas and vaporized light oil may be used for preheating the aqueous solids-light fluidizing oil mixture by injection into fluidizing tank 10 or, indeed, at any other location in the system where recovery of its energy can offer process credits.

Thus, in its broadest sense, the instant invention provides process and apparatus for removing light oil from solids. The invention is particularly applicable to the removal of residual light oil from solids obtained in a process where aqueous solids are dehydrated in a light fluidizing oil medium and the major part of light fluidizing oil separated from the essentially anhydrous solids. Similarly, the invention finds utility in the removal of residual light oil from solids obtained in a process where aqueous solids are dehydrated in a heavy, relatively non-volative fluidizing oil and the major part of the heavy oil separated from the essentially dry solids. Residual heavy oil is thereafter removed from the solids by extraction with a light oil. The foregoing processes are characterized by the recovery of clean water from aqueous solids dehydrated in a fluidizing oil medium as well as by the recovery of residual light oil from the solids after the dehydration thereof. The light oil-laden solids are brought into direct contact with a hot, inert blowing gas which removes the residual light oil by heat evaporation. Furthermore, the invention makes possible the winning or recovery of solids that are not only dehydrated but which are deoiled beyond the point usually attainable solely by mechanical means.

While specific embodiments of the present invention have been shown and described in detail to illustrate the utilization of the inventive principles, it is to be understood that such showing and description have been offered only by way of example and not by way of limitation. Protection by Letters Patent of this invention in all its aspects as the same are set forth in the appended claims is sought to the broadest extent that the prior art allows.

We claim as our invention:

1. An apparatus for recovering clean water and substantially dry, fluidizing oil-free solids from aqueous solids dehydrated in a light fluidizing oil medium, comprising: a tank to receive a stream of said aqueous solids having a mixing mechanism, a light fluidizing oil reservoir, means for transmitting light fluidizing oil from said light oil reservoir to said tank, an evaporator, a conduit extending from said tank to said evaporator, a first condenser, a conduit extending from said evaporator to said first condenser, an oil-water separating means, a conduit extending from said first condenser to said oil-water separating means, means for separately withdrawing light oil and clean water from said oil-water separating means, a conduit extending from said withdrawing means to said light fluidizing oil reservoir, a liquid-solid separating means, a conduit extending from said evaporator to said liquid-solid separating means, a deoiler means, a conduit extending from said liquid-solid separating means to said deoiler means, a conduit extending from said liquid-solid separating means to said light fluidizing oil reservoir, a boiler-furnace having a boiler region and a heating region, a conduit extending from the boiler region of said boiler-furnace to said evaporator, a conduit extending from the heating region of said boiler-furnace to said deoiler means, a second condenser, a conduit extending from said deoiler means to said second condenser, and means connecting said second condenser with said light fluidizing oil reservoir.

2. The apparatus of claim 1 wherein the conduit extending from the heating region said boiler-furnace to said deoiler means is fitted with a fan to facilitate movement of hot, inert blowing gas through said conduit.

3. An apparatus for recovering clean water and substantially dry, fluidizing oil-free solids from solids dehydrated in a light fluidizing oil medium comprising: a tank to receive a stream of said aqueous solids having a mixing mechanism, a light fluidizing oil reservoir, means for transmitting light fluidizing oil from said light oil reservoir to said tank, an evaporator, a conduit extending from said tank to said evaporator, a first condenser, a conduit extending from said evaporator to said first condenser, an oil-water separating means, a conduit extending from said first condenser to said oil-water separating means, means for separately withdrawing light oil and clean water from said oil-water separating means, a conduit extending from said withdrawing means to said light fluidizing oil reservoir, a liquid-solid separating means, a conduit extending from said evaporator to said liquid-solid separating means, a deoiler means, a conduit extending from said liquid-solid separating means to said deoiler means, a conduit extending from said liquid-solid separating means to said light fluidizing oil reservoir, a boiler-furnace having a boiler region and a heating region, a conduit extending from the boiler region of said boiler-furnace to said evaporator, a heat transfer device disposed within the heating region of said boiler-furnace, said heat transfer device having a first end and a second end, a conduit extending from the first end of said heat transfer device to said deoiler means, a second condenser, a conduit extending from said deoiler means to said second condenser, means connecting said second condenser with said light fluidizing oil reservoir, and a conduit extending from said second condenser to the second end of said heat transfer device.

4. The apparatus of claim 3 wherein the conduit extending from said heat transfer device first end to said deoiler means is fitted with a fan to facilitate movement of hot, inert blowing gas through said conduit.

5. An apparatus for recovering clean water and substantially dry, fluidizing oil-free solids from aqueous solids dehydrated in a light fluidizing oil medium, comprising: a tank to receive a stream of said aqueous solids having a mixing mechanism, a light fluidizing oil reservoir, means for transmitting light fluidizing oil from said light oil reservoir to said tank, an evaporator, a conduit extending from said tank to said evaporator, a first condenser, a conduit extending from said evaporator to said first condenser, an oil-water separating means, a conduit extending from said first condenser to said oil-water separating means, means for separately withdrawing light oil and clean water from said oil-water separating means, a conduit extending from said withdrawing means to said light fluidizing oil reservoir, a liquid-solid separating means, a conduit extending from said evaporator to said liquid-solid separating means, a deoiler means, a conduit extending from said liquid-solid separating means to said deoiler means, a conduit extending from said liquid-solid separating means to said light fluidizing oil reservoir, a boiler-furnace having a boiler region for the generation of steam, a conduit extending from the boiler region of said boiler-furnace to said evaporator, an additional combustion apparatus separate from said boiler-furnace having a heating region for generating products of combustion, a conduit extending from the heating region of said combustion apparatus to said deoiler means, a second condenser, a conduit extending from said deoiler means to said second condenser, and means connecting said second condenser with said light fluidizing oil reservoir.

6. The apparatus of claim 5 wherein the conduit extending from the heating region of said combustion apparatus to said deoiler means is fitted with a fan to facilitate movement of hot, inert blowing gas through said conduit.

7. An apparatus for recovering clean water and dry, essentially oil-free solids from aqueous solids dehydrated in a relatively non-volatile fluidizing oil medium, comprising: a tank to receive a stream of said aqueous solids having mixing mechanism, a relatively non-volatile fluidizing oil reservoir, means for transmitting relatively non-volatile oil from said oil reservoir to said tank, an evaporator, a conduit extending from said tank to said evaporator, a first condenser, a conduit extending from said evaporator to said first condenser, means for withdrawing water vapor condensate from said first condenser as a clean water product, a liquid-solid separating means, a conduit extending from said evaporator to said liquid-solid separating means, a light oil reservoir, a conduit extending from said light oil reservoir to said liquid-solid separating means, conduit means extending from said liquid-solid separating means to said non-volatile oil reservoir, conduit means extending from said liquid-solid separating means to the evaporating region of said evaporator, a deoiler means, a conduit extending from said liquid-solid separating means to said deoiler means, a boiler-furnace having a boiler region and a heating region for generating steam and products of combustion, a conduit extending from the boiler region of said boiler-furnace to said evaporator, a conduit extending from the heating region of said boiler-furnace to said deoiler means, a second condenser, a conduit extending from said deoiler means to said second condenser, and means connecting said second condenser with said light fluidizing oil reservoir.

8. The apparatus of claim 7 wherein the conduit extending from the heating region of said boiler-furnace to said deoiler means is fitted with a fan to facilitate movement of hot, inert blowing gas through said conduit.

* * * * *

UNITED STATES PATENT AND TRADEMARK OFFICE
CERTIFICATE OF CORRECTION

PATENT NO. : 4,608,120
DATED : August 26, 1986
INVENTOR(S) : Charles Greenfield et al.

It is certified that error appears in the above—identified patent and that said Letters Patent is hereby corrected as shown below:

Col. 1, line 25: "yeild" should read --yield--.
Col. 1, line 67: "Braodly" should read --Broadly--.
Col. 3. line 60: "reelatively" should read --relatively--.
Col. 5, line 21: "subsequenly" should read --subsequently--.
Col. 5, line 22: "dehdration" should read --dehydration--.
Col. 5, line 34: "operating" should read --operation--.
Col. 7, line 35: between the closing parenthesis and the period insert --is carbon dioxide (M.W. 44)--.
Col. 8, line 1: "combusion" should read --combustion--.
Col. 15, line 10: "combusion" should read --combustion--.
Col. 16, line 15: "this" should read --the--.
Col. 16, line 21: "recycles" should read --recycled--.
Col. 16, line 22: after "oil" add --content--.
Col. 18, line 48: "withthe" should read --with the--.
Col. 18, line 55: "or" should read --of--.

UNITED STATES PATENT AND TRADEMARK OFFICE
CERTIFICATE OF CORRECTION

PATENT NO. : 4,608,120

DATED : August 26, 1986

INVENTOR(S) : Charles Greenfield et al.

It is certified that error appears in the above—identified patent and that said Letters Patent is hereby corrected as shown below: (Cont'd)

Col. 19, line 5: "Pan" should read --Fan--.

Col. 20, line 2: "that" (first occurrence) should read --by--.

Col. 20, line 58: Cancel "the" (first occurrence).

Col. 20, line 60: Cancel "the" (second occurrence).

Col. 23, line 64 (Claim 2, line 2): between "region" and "said" insert --of--.

Signed and Sealed this

Thirtieth Day of December, 1986

*Attest:*

DONALD J. QUIGG

*Attesting Officer*  *Commissioner of Patents and Trademarks*